H. K. MOORE.
MACHINE FOR TESTING LUBRICATING OILS.
APPLICATION FILED AUG. 27, 1917.
1,395,448.
Patented Nov. 1, 1921.
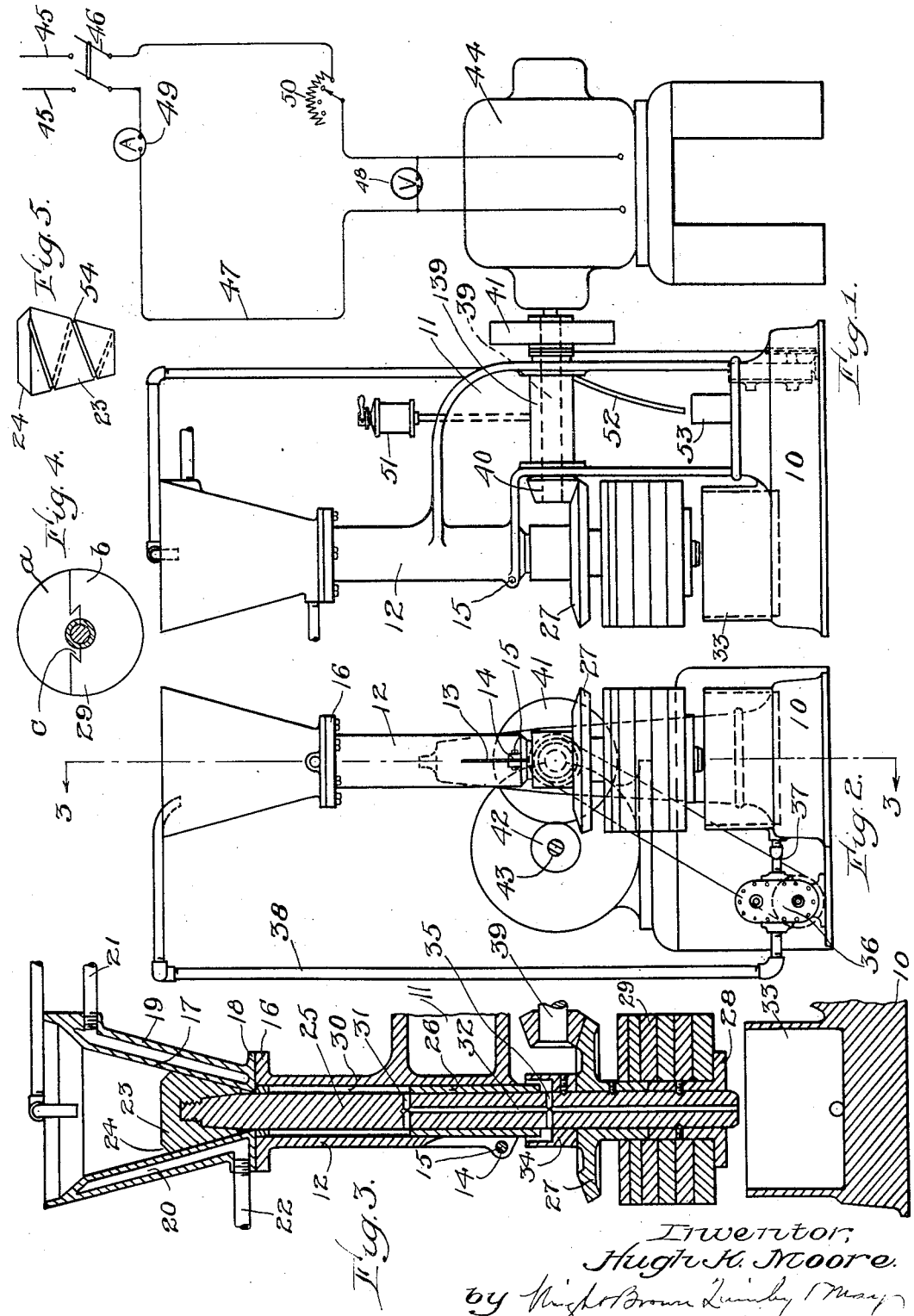
Inventor;
Hugh K. Moore.
by
Attorneys.

UNITED STATES PATENT OFFICE.

HUGH K. MOORE, OF BERLIN, NEW HAMPSHIRE, ASSIGNOR TO BERLIN MILLS COMPANY, OF BERLIN, NEW HAMPSHIRE, A CORPORATION OF MAINE.

MACHINE FOR TESTING LUBRICATING-OILS.

1,395,448. Specification of Letters Patent. Patented Nov. 1, 1921.

Application filed August 27, 1917. Serial No. 188,298.

*To all whom it may concern:*

Be it known that I, HUGH K. MOORE, a citizen of the United States, residing at Berlin, in the county of Coos and State of New Hampshire, have invented new and useful Improvements in Machines for Testing Lubricating-Oils, of which the following is a specification.

The object of the present invention is to provide a method and a machine for testing lubricating oils by which the durability and also the friction or power consumption of the oil may be accurately ascertained under varying conditions such as load and temperature. In the selection of the most suitable lubricating oil for plant operation, there must be primarily considered, first, the specific conditions under which the lubricant is used, the cost thereof and the cost of power, since a lubricant, which may possess optimum qualities for one specific purpose, may be unsuitable or uneconomical for another purpose or in another plant where the power cost is high. The machine, which I have selected for illustration as embodying my invention, is provided with a conical member operating in a conical bearing and rotated while under pressure by an electric motor, and with means for measuring the power consumption.

On the accompanying drawings,—

Figure 1 illustrates in side elevation a machine embodying the invention.

Fig. 2 represents a front elevation thereof.

Fig. 3 represents a vertical longitudinal section through the machine on the line 3—3 of Fig. 2, parts of the frame and the motor being omitted.

Fig. 4 represents one of the weights.

Fig. 5 shows the cone or rotary bearing member.

The machine comprises a frame of any suitable design. As shown, the frame consists of a base 10, a standard 11 rising therefrom and projecting forwardly at its upper end, and a tubular support 12, which is split at 13 for a portion of its length and provided with lugs 14 to receive a clamping bolt 15. The upper end of the tubular support is flanged as at 16, so that the frusto-conical oil receptacle and bearing 17 having a complemental base flange 18 may be secured thereon. In order that the temperature of the lubricant being tested may be controlled, the receptacle and the bearing portion thereof 17 are inclosed in a jacket 19 to form a chamber 20 to and from which a heating or a cooling or refrigerating medium may be conducted through pipes 21, 22, for raising or lowering or maintaining a predetermined temperature during the testing of a given lubricant.

The rotary member is indicated at 23 and it is in the shape of an inverted frusto cone (so as to fit the bearing) with its base beveled at 24. The vertical angle of the cone or member 23 and its bearing may be changed, though for usual purposes I prefer an angle of approximately 30°. The cone and its bearing may be made of suitable metal. For example, the bearing may be brass suitably surfaced, and the cone may be made of bronze, ground and finished.

Pressure is exerted upon the cone, and, to this end, it is secured upon the upper end of a shaft 25, which extends to a point below the tubular support and is provided with weights. To keep the shaft in true alinement, it is steadied by a short sleeve 26 clamped in the lower end of the tubular support. A conventionally illustrated bevel gear 27 is keyed or otherwise secured upon the shaft, and below the gear there is a disk 28 which affords support for a variable number of weights 29. Each weight may be constructed, as shown in Fig. 4, in two sections *a b*, one having a dovetail or undercut tongue *c* to move in the direction of the axis of the weight into a complementally shaped groove in the other to provide an interlocking connection between them, in order that the weights cannot be accidentally displaced when the machine is in operation.

When the bearing 17, which extends a material distance above the cone for the purpose, is charged with a given quantity of lubricant, such oil as passes the cone flows into the tubular space 30 between the shaft and the tubular support, and thence through lateral or radial ports 31 to an axial aperture or conduit 32 all in the shaft 25. The lubricant drips from the aperture 32 into a receptacle 33 formed in or placed on the base 10 of the machine. A cup 34 is secured on the shaft below the sleeve 26 to catch any drip therefrom and conduct it to radial ports 35 in the shaft. From the receptacle 33, the lubricant may be forced by a pump 36 back again to the bearing, through pipes 37, 38, said pump being driven in any suitable way from a source of power, as by a belt from a shaft 39 to be described.

Any suitable form of power-transmitting mechanism may be utilized for rotating the shaft. As shown, a horizontal shaft 39 is journaled in a bearing 139 in the standard and has on its front end a bevel gear 40 meshing with gear 27, and on its rear end a reducing gear 41 engaged and driven by a pinion 42 on the motor shaft 43. 44 indicates a d. c. motor of low power, say ½ h. p., supplied with current from a main line circuit of which the conductors are indicated at 45, there being a suitable switch at 46: In the motor circuit 47 there are a volt meter 48, an ammeter 49, and a starting rheostat or variable resistance 50. The oil cup 51 for the bearing 139 is supplied with lubricant from the batch being tested, and the pipe 52 from the bearing delivers the drip to a cup or receptacle 53.

The cone or frusto-conical bearing member 23 may have an unbroken bearing surface, or it may be provided with one or more oil grooves as at 54 in Fig. 5.

The power consumption or friction during the operation of testing a certain lubricant is measured by the volt meter and the ammeter, since, knowing the efficiency of the motor, the results obtained by using different lubricating oils in the bearing are directly comparable. The comparison also may be made by operating each time with a predetermined power input (measured in watts), the motor bearings and the transmission bearings being kept lubricated with a large excess of the same lubricant which is being tested. If the temperature rise of the bearing is of importance, a thermometer is suspended in the excess oil above the cone. Where the power consumption is the determining factor, the current input in watts is plotted against time, the oil being circulated, and in this way the durability or "breaking down" qualities of the oils may be studied and compared.

The lubricant also may be tested by cutting out the oil pump, keeping the current input constant, and dropping the lubricant on the bearing as needed, thus ascertaining the quantity of oil consumed per hour. In this test a smooth cone (i. e. without peripheral oil grooves) is used.

A third method of testing the lubricant, which preferably may be followed, is to start the machine without the pump, and to add a predetermined quantity of oil (say 3 c. c.) to the bearing and record the power input per minute. The machine is operated until a certain maximum allowable power input is reached, and the results are charted in the form of a curve, power (expressed in watts) being plotted against time expressed in minutes. This test gives valuable results in determining the internal friction (power consumption) and also the durablity of the oils being tested.

The pressure of the bearing surfaces may be increased or decreased by adding or removing some of the weights 29 and the temperature of the lubricant may be maintained or raised or lowered by a suitable medium circulated through the jacket of the conical bearing.

Having thus explained the nature of my said invention and described a way of making and using the same, although without attempting to set forth all of the forms in which it may be made or all of the modes of its use, what I claim is:

1. An apparatus for testing lubricating oils, comprising an immovable inverted conical bearing to which the lubricant is supplied, a complemental rotary member, means for exerting axial pressure on said member, and means for measuring the power required to rotate said member.

2. An apparatus for testing lubricating oils, comprising an immovable inverted conical bearing to which the lubricant is supplied, a complemental rotary member, and means for exerting axial pressure on said member, in combination with means for rotating said member and means for measuring the power required to rotate said member.

3. An apparatus for testing lubricating oils, comprising an upright oil receptacle having a stationary bearing at its lower end, a rotary member complemental to said bearing, electrical means for rotating said member, and means for measuring the electric power consumption.

4. An apparatus for testing lubricating oils, comprising a non-rotary inverted conical bearing, a cone-shaped rotary member supported thereby, means for rotating said member, means for circulating the lubricant to be tested through said bearing and back again thereto, and means for measuring the power consumed in rotating said member.

5. An apparatus for testing lubricating oils, comprising an inverted conical bearing, a cone-shaped rotary member supported thereby, a shaft depending from said member, a weight removably supported on said shaft and means for rotating said shaft and said member.

6. An apparatus for testing lubricating oils, comprising a stationary inverted conical bearing, a cone-shaped rotary member supported thereby, means for rotating said member and means for controlling the temperature of said bearing, including a jacket therefor and means for conducting fluid thereto.

7. An apparatus for testing lubricating oils, comprising an oil receptacle having a non-rotary inverted conical bearing at its lower end, a rotary member complemental to said bearing, a jacket inclosing said receptacle for receiving a medium for controlling the temperature of the contained oil and the bearing, an electric motor for rotating said member, and means for measuring the electric power consumption.

8. An apparatus for testing lubricating oils, comprising an inverted conical bearing, a complemental rotary member, and circulating means for circulating the oil to be tested through said bearing and back again to said bearing.

9. An apparatus for testing lubricating oils, comprising an immovable inverted conical bearing, a complemental rotary member supported by said bearing, an electric motor and power-transmitting mechanism for rotating said member, and means for measuring the consumption of electric current by said motor in rotating said member.

10. An apparatus for testing oils, comprising a vertical shaft, an inverted cone on the upper end thereof, an oil receptacle having a conical bearing for receiving said cone and supporting it and the shaft, weighing means removably mounted on said shaft, a pump for circulating back to the receptacle oil passing the bearing and the cone, and means for rotating said shaft and said cone.

11. An apparatus for testing oils, comprising a vertical shaft, an inverted cone on the upper end thereof, an oil receptacle having a conical bearing for receiving said cone and supporting it and the shaft, weighing means removably mounted on said shaft, a pump for circulating back to the receptacle oil passing the bearing and the cone, means for rotating said shaft and said cone, and a jacket encircling said oil receptacle to form a chamber for the reception of a temperature-controlling medium.

12. A method of testing lubricating oils, which consists in continuously circulating the oil to be tested between two complemental frictionally-engaged members, furnishing an electric current, rotating one of said members relatively to the other by an electric motor supplied with said current while holding said other member against rotation, and measuring the electrical consumption power required in rotating said member.

In testimony whereof I have affixed my signature.

HUGH K. MOORE.